July 3, 1928.
G. H. HARVEY
1,676,027
PROCESS AND APPARATUS FOR DRAWING SHEET GLASS
Filed May 13, 1926
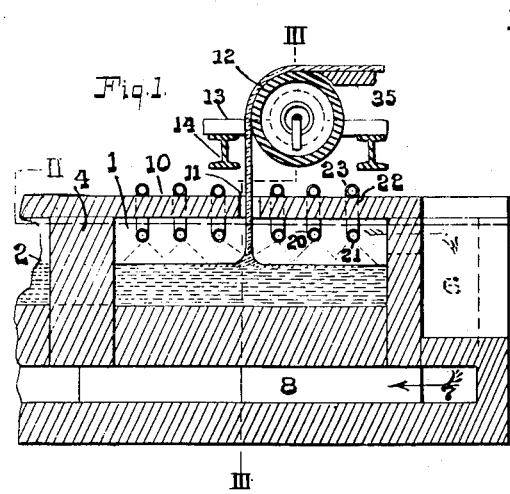
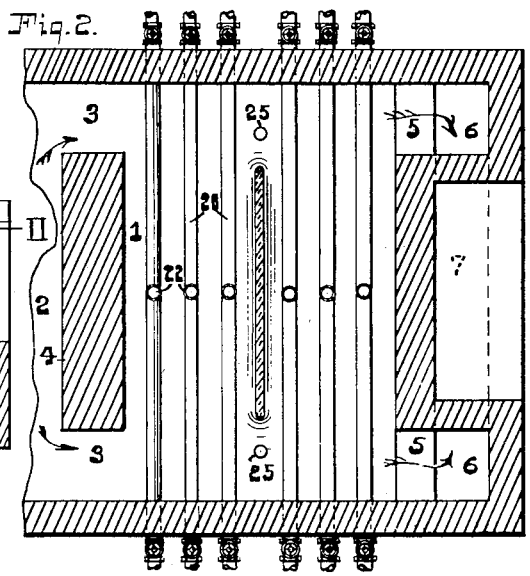
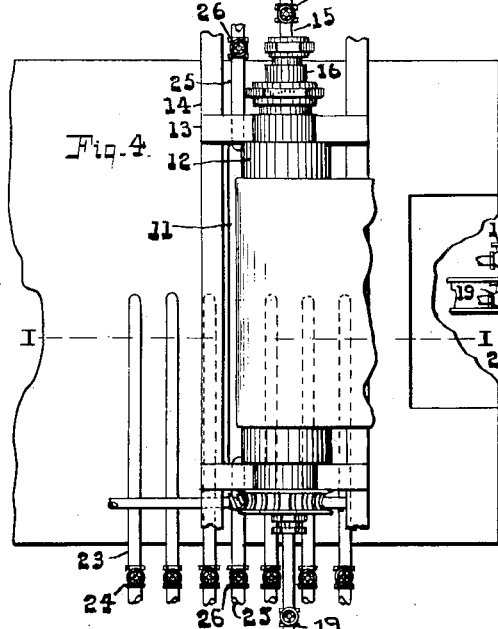
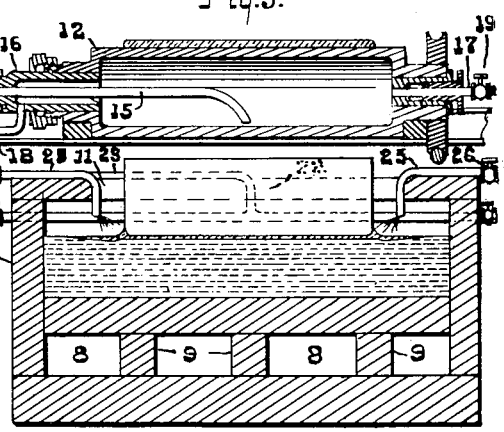
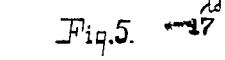
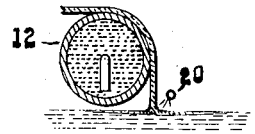
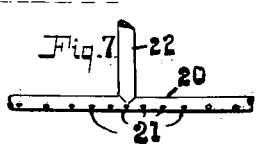
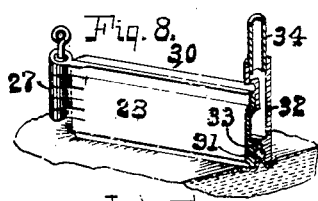
Inventor,
George H. Harvey Patented July 3, 1928.

1,676,027

UNITED STATES PATENT OFFICE.

GEORGE H. HARVEY, OF ROCHESTER, PENNSYLVANIA, ASSIGNOR OF ONE-HALF PARTNERSHIP INTEREST TO EDWARD A. LAWRENCE, OF BELLEVUE, PENNSYLVANIA.

PROCESS AND APPARATUS FOR DRAWING SHEET GLASS.

Application filed May 13, 1926. Serial No. 108,865.

One of the objects which I have in view is the more expeditious drawing of glass in the form of a flat sheet.

Another object which I have in view is the drawing of sheet glass in hitherto unattainable thicknesses and of uniform width.

Another object which I have in view is the formation of sheet glass having smooth uniform surfaces, of uniform thickness, and with parallel edges.

Broadly stated my improved process comprises the drawing upwardly of the surface film of a body of molten glass from opposite directions in the form of a flat sheet, the former top surfaces of the film forming the exterior side surfaces of the glass while the hotter lower surfaces of the film unite at the apex of the draw to form the interior of the sheet.

The edges of the sheet are formed by the film drawn inwardly at the ends of the apex of the draw.

In general, my improved process is characterized by the artificial formation of a surface film on the body of molten glass and the upward drawing of the film from opposite directions from the surface of the glass, the hotter and originally lower surfaces of the film uniting at the apex of the draw at the center of the sheet while the originally upper surfaces of the film form the exterior surfaces of the sheet.

The edges of the sheet are formed by the originally upper surfaces of the film drawn inwardly to the apex of the draw.

The thickness of the sheet is determined by the thickness of the film, and thus by regulating the thickness of the film I obtain the desired thickness of sheet. I am thus enabled to produce sheets of a wide range of thickness, and also of a greater thickness than has hitherto been possible commercially. Where a film of relative slight or moderate thickness is required I may chill the surface of the glass in the tank or container, to form the film, by the proximity thereto of water cooled elements or boshes or I may cool the surface of the body of glass by the application of air. Where films of greater thickness are required I prefer to apply moisture to the surface of the glass, as by spraying water thereon or, as preferable, by spraying steam on or in close proximity to the surface of the glass. By regulating the amount of such moisture I am able to produce the thickness of film required for the thickness desired in the sheet glass.

If desired I employ moisture to form the film at one side of the apex of the draw and use water cooled elements or air applications at the other side.

In a sheet of glass being drawn from a body of molten glass the glass toward the center of the sheet is hotter than that toward the edges and therefore tends to draw faster, tending to make the center of the sheet thinner than the edges thereof.

In my process I correct this tendency toward ununiform thickness by chilling the apex of the draw in such a manner that the sheet will be drawn with even thickness throughout its full width. I accomplish this purpose by increasing the relative chilling toward the center of the sheet, thus equalizing the temperature and consequently the viscosity of the sheet.

Again the hotter center portions of the sheet in drawing out faster than the cooler edge portions tend to draw in the edges of the sheet so that they are no longer vertical and parallel, producing a sheet of ununiform width.

In my process I overcome this tendency by chilling the ends of the apex of the draw, thereby giving the edges the necessary strength to hold their vertical alinement.

In the accompanying drawings, I have illustrated a new and improved apparatus for working my process.

In the accompanying drawings, wherein I have illustrated the best embodiment of the principles of my invention now known to me, Fig. 1 is a sectional view showing the drawing receptacle and the lead-off roll, the same being taken along the line I—I in Fig. 4; Fig. 2 is a horizontal section taken along the line II—II in Fig. 1; Fig. 3 is a vertical section taken along the line III—III in Fig. 1; Fig. 4 is a plan view; Fig. 5 is a detail in vertical section illustrating the leading-off of the drawn sheet, the roll being shown in chilling proximity to the surface of the glass instead of mounted above the roof as in Figs. 1, 3 and 4; Fig. 6 shows a modification thereof when the roll is in chilling contact with the surface of the glass;

Fig. 7 is a detail of one of the spray devices employed to form the film in the receptacle, and Fig. 8 is a perspective, cut in cross-section, of the novel form of bait employed.

Referring to the drawings, 1 represents the receptacle from which the glass is drawn, the same being preferably a shallow extension of the continuous melting tank 2 from which the receptacle 1 is kept supplied with molten glass, as through the ports 3 at either end of the dividing wall 4. The gas flames may be led from the container through the ports 5 at either side of the front connecting with down-flues 6 which in turn connect at their bottom with the header passage 7 which communicates with the front end of the floor flues 8 which are separated from each other by the partitions 9 which support the floor of the receptacle.

The roof 10 of the receptacle 1 is provided with a transversely disposed drawing slot 11 which is less in length than the interior width of the receptacle and preferably than the length of the dividing wall 4.

12 represents the lead-off roll which is employed to enable the sheet to be directed horizontally to the lehr. The roll is shown in Figs. 1, 3 and 4 as mounted above the roof, but in Fig. 5 the roll 12 is shown lowered into chilling proximity to the glass and in Fig. 6 I show it lowered into chilling contact with the glass. These modifications will be later referred to in greater detail.

The roll 12 is of relatively great diameter to facilitate the change of direction of the travel of the glass, and is water cooled to chill and set the sheet.

I have shown the trunnions of the roll journaled on supports 13 carried by a superstructure indicated at 14.

The water may be introduced by means of a pressure inlet pipe 15 extending through a stationary bushing 16 extending into one of the hollow trunnions of the roll to a point at approximately the center of the roll and having its discharge end down-turned. One outlet pipe 17 leads through the opposite trunnion while another outlet pipe 18 connects to the outer end of the bushing 16. The inlet and outlet pipes are provided with suitable valves 19 so that by controlling the ingress and egress of the water the roll may be maintained at uniform temperature throughout and at the temperature best suited for working the glass.

The interior of the receptacle is provided with transversely disposed spray pipes 20 having a row of flaring or spray openings 21, the openings 21 in the two pipes 20 at either side of the apex of the dotted lines being closer together toward the middle of the pipe to increase its spraying effect from the ends toward the middle. The spray pipes are connected at their centers to and are supported by the vertical pipes 22 which extend down through holes in the roof 10 and are connected at their upper ends to the supply pipes 23 which are provided with suitable regulating valves 24.

25 represents two pipes extending down at each end of the slot 11 and having their inner ends closed and perforated in such a manner as to discharge a spray on the surface of the glass adjacent to each end of the draw and also on each end of the apex of the draw and of the sheet just as it emerges from the apex. The pipes 25 are provided with suitable regulating valves 26.

27 is the drawing bait which is composed of two plates 28 and 30, hinged together at one end and at the other end provided with a suitable locking means, not shown, but readily understood or identical with the locking means generally employed in locking partible molds in glass fabricating machines.

When closed together the plates 28 and 30 form between them the bottom slot 31 upwardly enlarging into which the glass is sucked by means of subatmospheric pressure produced in the upper chamber 32, connected to the slot 31 by the ports 33, by the vacuum pipe 34.

In operation the bait 27 is let down through the slot 11 into contact with the surface of the molten glass, and suction is applied by means of the vacuum pipe 34 drawing a portion of the glass up into the bottom slot 31 wherein it sets, thus attaching the glass to the bait. The bait is then raised up through the slot 11 drawing the glass in a sheet thereafter until the upper end of the sheet may be turned horizontally over the lead-off roll 12 and led off to the lehr. At the rear of the roll 12 I provide a table 35 over which the glass may be caused to travel.

To cause the formation of the film on the glass which as it is drawn from opposite directions forms the sheet I apply chilling fluid to the upper surface of the glass through the perforations in the pipes 20.

Where a sheet of moderate thickness is to be drawn the fluid may be air but where sheets of greater thickness are to be drawn water vapor or spray, such as steam is employed.

By increasing the discharge of the fluid toward the center of the sheet, as by increasing the number of spray perforations 21, the temperature of the center of the sheet is equalized with that of the ends thereof, thus preventing the center of the sheet being drawn thinner than the portions toward the edges.

To prevent the edges of the sheet being drawn inwardly, thus destroying the parallelism of the side edges of the sheet, I discharge cooling fluid or spray against the surface of the body of molten glass adjacent to the ends of the apex of the draw to produce the necessary film and also likewise discharge the cooling fluid, as indicated at Fig. 3 against the edges of the sheet as it forms at the apex of the draw, thus chilling the edges and giving them the necessary strength to resist the tension of the draw without drawing in.

In Fig. 5 I show the water-cooled roll 12 lowered so that it acts as a film forming agent at one side of the apex of the draw, while the film at the other side is formed by the fluid from the pipe 20. In Fig. 6 I show the roll lowered into cooling contact with the glass.

Thus at one side the film is formed by proximity to or contact with the molten glass and at the other side by means of the application of chilling fluid.

What I desire to claim is:—

1. The process for producing sheet glass which consists in artificially producing a film of the necessary thickness on the top surface of a body of molten glass by spraying moisture thereon and drawing said film upwardly in a straight line from opposite directions so that the former top surface of the film forms the exterior surfaces of the sheet while the hotter and formerly lower portions of the film unite to form the body of the sheet.

2. The process for producing sheet glass which consists in forming a film of the necessary thickness on the top surface of a body of molten glass by the application of a moisture thereto and drawing said film in a straight line from opposite directions so that the former top surface of the film forms the exterior surfaces of the sheet while the hotter and formerly lower portions of the film form the body of the sheet.

3. The process for producing sheet glass which consists in artificially forming a film by the application of moisture on the surface of a body of molten glass at opposite sides of the line of drawing and drawing said film upwardly along a straight line from opposite directions.

4. The process for producing sheet glass which consists in artificially forming a film by the application of moisture on the surface of a body of molten glass, said film surrounding the line of draw and then drawing the film upwardly from the body of molten glass.

5. The process for producing sheet glass which consists in artificially forming a film by the application of moisture on the surface of a body of molten glass, drawing said film upwardly along a straight line from opposite directions, and artificially chilling the edges of the draw to prevent narrowing.

6. The process for producing sheet glass which consists in artificially forming a film by the application of moisture on the surface of a body of molten glass, drawing said film upwardly along a straight line, and applying a chilling effect to the surface of the sheet increasingly toward its center to maintain a uniform thickness.

7. The process for producing sheet glass which consists in artificially forming a film by the application of moisture on the surface of a body of molten glass, drawing said film upwardly along a straight line, applying a chilling effect to the surface of the sheet increasingly toward its center to maintain a uniform thickness, and chilling the vertical edges of the sheet to prevent narrowing.

8. In apparatus for drawing sheet glass, the combination with a receptacle for the molten glass and a bait arranged to be lowered into contact with the surface of the glass and then elevated to draw the glass upwardly in the form of a flat sheet, of means for producing a spray of moisture to form a film on the top surface of the glass adjacent to the line of draw.

9. In apparatus for drawing sheet glass, the combination with a receptacle for the molten glass and a bait arranged to be lowered into contact with the surface of the glass and then elevated to draw the glass upwardly in the form of a flat sheet, of means for spraying aqueous fluid over the surface of the molten glass to form a film thereon on both sides of the line of draw.

10. In apparatus for drawing sheet glass, the combination with a receptacle for the molten glass and a bait arranged to be lowered into contact with the surface of the glass and then elevated to draw the glass upwardly in the form of a flat sheet, of means for spraying aqueous fluid over the surface of the glass on both sides and at both ends of the line of draw to form a film on the surface of the molten glass.

11. In apparatus for drawing sheet glass, the combination with a receptacle for the molten glass and a bait arranged to be lowered into contact with the surface of the glass and then elevated to draw the glass upwardly in the form of a flat sheet, and means for discharging an aqueous spray for forming a film on the top surface of the molten glass at both sides of the line of draw, said means being arranged to have a chilling effect increasing from the vertical edges toward the center of the line of draw.

12. The process of producing sheet glass which comprises forming a film on a body of molten glass by applying a moisture spray to the top surface of the glass and then withdrawing said film in sheet formation.

13. The process of producing sheet glass which comprises forming a film on a body of molten glass by applying a moisture spray to the top surface of the glass and then drawing the film upwardly along a line intermediate of the extent of the film.

14. The process of producing sheet glass which comprises forming a film on a body of molten glass by applying a moisture spray in close proximity to the top surface of the glass and then withdrawing said film in sheet formation.

15. The process of producing sheet glass which comprises forming a film on a body of molten glass by applying a moisture spray in close proximity to the top surface of the glass and then drawing the film upwardly along a line intermediate of the extent of the film.

Signed at Pittsburgh, Pa., this 12th day of May, 1926.

GEORGE H. HARVEY